May 7, 1957 J. B. GODSHALK ET AL 2,791,749
BATTERY CHARGING AND TESTING APPARATUS
Filed May 3, 1955
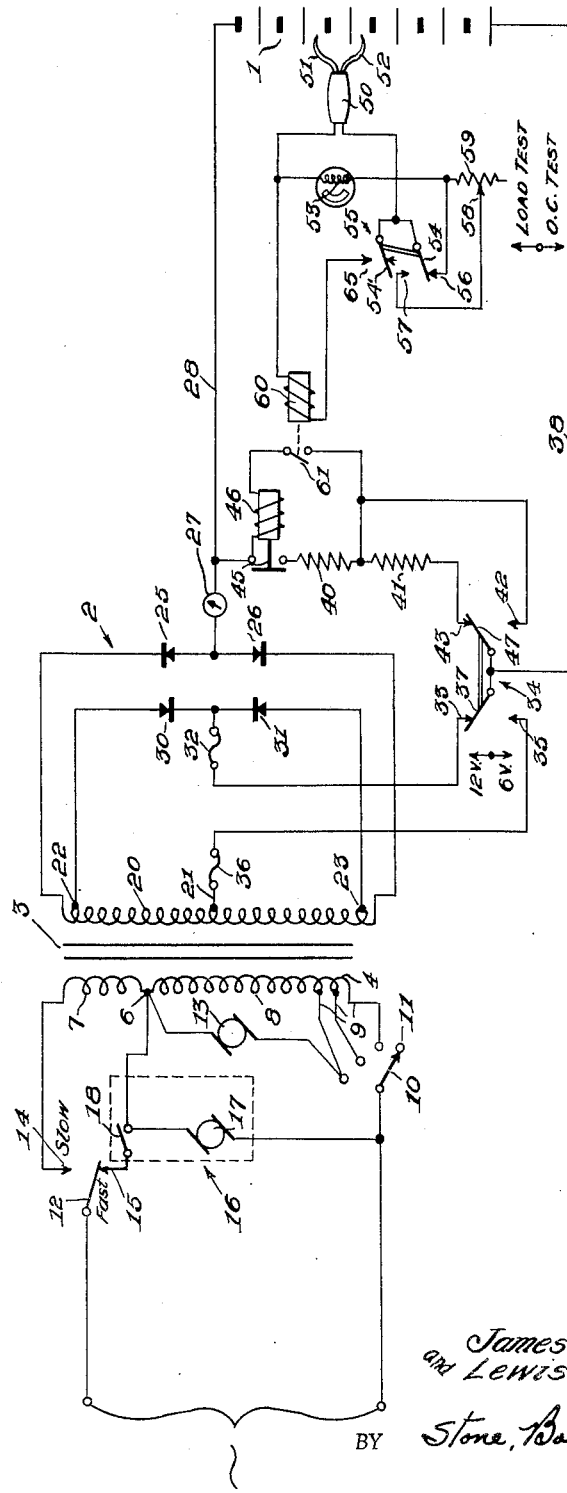
INVENTORS
James B. Godshalk
and Lewis A. Median
BY Stone, Boyden & Mack
ATTORNEYS United States Patent Office 2,791,749
Patented May 7, 1957

2,791,749

BATTERY CHARGING AND TESTING APPARATUS

James B. Godshalk, West Pikeland Township, Chester County, and Lewis A. Medlar, Oreland, Pa., assignors to Fox Products Company, Philadelphia, Pa., a corporation of Pennsylvania Application May 3, 1955, Serial No. 505,670

11 Claims. (Cl. 324—29.5)

This invention relates to battery charging and testing apparatus and, more particularly, to a single combination battery charging and testing apparatus which makes it possible to charge a battery and test it either open-circuited or under load.

Many different types of tests have been devised for batteries which are used to determine whether a battery is in usable condition or not. For instance, open circuit voltage tests of the cells of a battery to determine the condition of cell charge have been employed. Cell voltage comparison tests, with the battery either open-circuited or under load, have also been used. In such tests, a cell voltage deviation of more than a pre-determined amount from an established norm indicates the cell, and hence the battery, is "bad." These tests have been performed with many different types of apparatus, and service station personnel and like persons have had to become skilled in the use of different apparatus, some of which was quite complex, as well as had to furnish, or be furnished with, several different testing devices, in order to make the several different types of tests.

It is well-known that the most reliable indications of the condition of a battery are obtained after the battery is charged to a fairly considerable state, particularly if the battery is being tested while under discharge load. Consequently, servicemen and like personnel have had to have battery chargers available for testing, as well as for the usual charging purpose. These chargers generally have been entirely separate from and unconnected to the testing apparatus. Consequently, servicemen testing batteries have had to place a charger and perhaps several testing devices in the same general area while testing a battery, as well as to concern themselves with the proper connection, disconnection, and operation of the charger, the testing devices and a discharge circuit.

A further test generally performed by servicemen testing batteries has been of the voltage regulator. Such test may be performed by checking the battery voltage while the associated engine is running at a low speed sufficient to cause a low charging current to flow in the battery circuit, but while no discharge resistance external to the ignition system is connected to the battery. Even when one of the testing devices useful for the tests outlined above was available, so that no extra equipment was needed, the connections of the various circuits and devices had to be changed and different operating instructions kept in mind while making this test.

All of these various operations to be performed with several different types of equipment have complicated the job of a serviceman to such an extent that he might well fail to make the various tests properly and so obtain improper results, or perhaps damage the equipment or the battery. The present invention is designed to provide all apparatus necessary for making these various tests in a single unit, and further, to decrease to a negligible extent the complexity of the various operations necessary to perform these tests.

A further complication in the serviceman's job of testing and charging batteries has arisen recently with the use by some automobile manufacturers of a twelve volt battery, rather than the old standard six volt model. Servicemen must now test and charge both six volt and twelve volt batteries, since many cars still have six volt models. One solution to this new problem is to maintain both a six volt and a twelve volt battery charger, as well as separate discharge circuits for both types of batteries. This is expensive and annoying, as well as complicative of charging and testing operations and wasteful of limited space. The apparatus of the present invention combines in a single unit a charger and a discharge circuit selectively usable with both twelve and six volt batteries. Consequently, expense and operational difficulties are tremendously reduced with this apparatus.

The apparatus of the present invention, generally speaking, includes a source of charging current for batteries, which may be connected to supply two different voltage outputs, a charging circuit connectable to a battery, a switching circuit for selecting which of the outputs is to be supplied, a discharge circuit connectable to the battery and having a resistance therein which is selectable by the switch to be in relationship with the voltage output for which the charger is connected, and a test meter circuit containing connections to connect the discharge resistance into or disconnect it from the circuit and elements to permit an open circuit test or a discharge cell voltage comparison test of the battery, as well as a test of the voltage regulator. All the operations and tests referred to above can be performed with the single apparatus with adjustment of only a pair of switches.

The apparatus of the present invention will now be more fully described in conjunction with the accompanying drawing, illustrating a preferred embodiment of the invention.

In the drawing, the single figure is a schematic representation of a combined battery charging and testing apparatus.

In the figure, the battery to be charged and tested is indicated at 1, and is supplied with charging current from a charging circuit indicated generally at 2. The charging circuit receives its supply voltage from a transformer 3 having a primary 4 connected to a source of A.-C. voltage of suitable level and frequency. The voltage source may be the usual 110 volts, 60 cycles supply. The primary of the transformer is tapped at 6 to provide a pair of primary coils 7 and 8. The coil 8 also has a number of taps 9 which are selected by a tap switch 10 having an inoperative position in cooperation with unconnected contact 11, the taps being provided to allow the selection of the proper charging current to be supplied to the battery charger circuit. A fan motor 13 may be connected between one of the taps 9 and the tap 6 to provide cooling air for the rectifier.

In order to provide for either fast or slow charging of the apparatus, a slow-fast toggle switch 12 is supplied, and the movable contact of switch 12 is connectable to contact 14 or 15, respectively, depending upon whether slow or fast charging is desired. A timing device indicated generally at 16 includes a timer motor 17 and a switch 18 operated by the timer motor. The series connection of the timer motor and switch is connected between one side of the A.-C. supply and the contact 15 of the slow-fast switch.

As will be apparent from the description of the primary circuit of the transformer 3, when the tap switch 10 is connected to one of the taps 9, the secondary of the transformer is supplied with voltage to operate the charging circuit 2. The amount of the voltage supplied the charging circuit is determined by the connection of the slow-fast switch, and the one of taps 9 to which the tap switch is connected. When the switch 12 connects contact 14 to the line, both primary 7 and primary 8 are in the circuit, but when the switch connects tap 15 to the line, only primary 8 is in the circuit connected to the A.-C. supply. Consequently, a higher voltage is supplied the charger circuit 2 when the slow-fast switch connects contact 15 to the line since a smaller number of turns is connected in the primary of the transformer at that time. The timer circuit 16 is provided to control the length of time that voltage is supplied to the charging circuit when the slow-fast switch is in the fast position. At the end of the charging period determined by the timer motor 17, the switch 18 opens, thus opening the circuit to the source of A.-C. voltage and ending the charge of the battery.

Referring now to the details of the charging circuit 2, the charging circuit includes a transformer secondary 20, having a center tap 21, and a pair of outside taps 22 and 23. The ends of the secondary 20 are each connected to one contact of a pair of back-to-back connected rectifiers 25 and 26. The common connection of the rectifiers 25 and 26 is connected through an ammeter 27 and through the normal charging circuit including lead 28 to the battery 1. The taps 22 and 23 of the transformer secondary are each connected to one terminal of a second pair of back-to-back rectifiers 30 and 31, reversely connected, with respect to rectifiers 25 and 26. The common connection of rectifiers 30 and 31 is connected through a circuit breaker 32 to contact 33 of a double-pole, double-throw selector switch 34. Another contact 35 of switch 34 is connected through a circuit breaker 36 to the center tap 21 of the transformer secondary.

Switch 34 includes a movable contact 37 selectively connectable to contacts 33 and 35. The movable contact 37 is connected to the opposite terminal of the battery 1.

It will be seen that the charging circuit of the drawing corresponds closely to the apparatus of Fig. 2 of Medlar application S. N. 346,158, filed April 1, 1953. The charging circuit of this application is specifically claimed in said Medlar application and will not be claimed herein except as a part of a combination with the discharging and testing apparatus, later to be described.

Reference is made to said Medlar application for a complete explanation of the voltage-changing operation of the charging circuit 2, and it need only be said here that when the movable contact 37 of selector switch 34 is connected to contact 33, a voltage is supplied to the charging circuit including leads 28 and 38 appropriate to charge a 12 volt battery. On the other hand, when movable contact 37 is connected to contact 35, a voltage is connected to the charging leads appropriate to charge a 6 volt battery.

The discharging apparatus of the present invention includes a resistance comprising a pair of discharge resistors 40 and 41 connected together in series, the common connection of the two resistors being connected to contact 42 of selector switch 34. The opposite end of resistor 41 is connected to contact 43 of the selector switch. The opposite end of resistor 40 is connected through a solenoid contactor 45 of a solenoid 46 to the lead 28 of the charging circuit.

It will be apparent that when solenoid contactor 45 is closed, either one only of the resistors, or both of the resistors is connected across the charging circuit. When movable contact 47, which also is connected to lead 38 of the charging circuit, is in its upper position, corresponding with the twelve volt position of swinger 37, both resistors 40 and 41 are connected to the charging circuit. On the other hand, when movable contact 47 is in its lower position, only resistor 40 is connected to the charging circuit. The resistors may be of appropriate values, depending upon the ampere-hour capacities of the batteries tested, and upon the desired discharge currents therefor. For instance, the resistors may be of such values that 150 to 170 amperes are discharged from a six volt battery under test, while 100 to 120 amperes are discharged from a 12 volt battery under test. The test meter circuit of the apparatus includes a probe 50, which preferably is a twin-pronged hand probe and has a pair of prongs 51 and 52. The prong 51 is connected to one side of a test meter coil 53 and the prong 52 may be connected to both swingers 54 and 54' of a double-pole, double-throw switch 55. Contact 56 of the switch is connected to the other side of test meter coil 53 and opposite contact 57 is connected to the movable arm 58 of a variable resistance, such as rheostat 59. The other side of the rheostat is connected also to the contact 56.

It will be obvious that when the movable contact 54 of the meter switch is in its upper position, as shown in the drawing, the series connection of the rheostat and the meter coil is connected across the prongs of the hand probe. When the movable contact 54 is in its lower position, only the meter coil is connected across the hand probe.

The test meter circuit also includes a relay 60 having a contact 61 arranged in series with solenoid 46. The series combination of the solenoid 46 and the relay contact 61 are connected across the series combination of resistor 40 and solenoid contactor 45. The relay 60 is connected between prong 51 of the probe and another contact 65 on the test meter switch. Contact 65 co-operates with movable contact 54', which in turn is connected with movable contact 54 of the switch. It will be apparent that when the test meter switch is in its lower position, the relay 60 is not connected across the probe, so that the relay is not actuated even when the probe is connected across a cell of the battery. The relay contact 61 is then open, and solenoid 46 is not actuated, so that solenoid contactor 45 is open and the discharge resistance is not connected to the charging lead 28.

In the operation of the system described above, when a battery is to be charged, movable contact 10 of the tap switch is connected to one of the taps 9. A voltage dependent upon the position of slow-fast toggle switch 12 is then supplied to the charging circuit 2. When the movable contact 37 of the selector switch 34 is in its upper position, a charging current appropriate to charge a 12 volt battery is supplied to charging leads 28 and 38. At that time the series combination of resistors 40 and 41 is connected to charging lead 38, but solenoid contactor 45 is open, so that the discharge resistors are not across the battery.

When it is desired to charge a six volt battery, the same steps are carried out as with a twelve volt battery, except that the selector switch 34 is connected in its lower position, so that a charging current appropriate to a six volt battery is supplied to the charging leads.

When a cell voltage open circuit test is desired, tap switch 10 is rotated to make contact with contact 11, thus disconnecting the supply of charging current, and test meter switch 55 is thrown to its lower position. In that position of the switch, the test meter coil 53 is connected directly across the prongs of the hand probe, and the prongs may be connected across the cells of the battery in succession. The voltages of the various cells may be read from a suitable meter dial, and the values obtained used to determine the condition of the battery in well-known fashion. It will be noted that at this time the discharge resistors are not connected across the battery.

If a cell voltage comparison discharge test is to be performed, test switch 55 is thrown to its upper position, and the prongs of the hand probe are connected across one of the cells of the battery. The relay 60 is then connected across the battery cell and is actuated by current flowing therefrom. Relay contact 61 consequently is actuated, causing energization of solenoid 46. Contactor 45 consequently closes, thus placing either resistor 40 or the series combination of the resistors 40 and 41 across the charging leads, depending upon the position of the switch 34. The rheostat 59 may then be adjusted by moving movable arm 58 to yield a zero reading on the volt meter associated with meter coil 53, to obtain a standard for comparison. The hand probe may then be moved to the other cells of the battery and the indications obtained on the meter, particularly the extent of each reading above and below zero, noted. It will be observed that when this discharge test is being carried out, the discharge resistance is always connected across the battery whenever the probe is across one of the cells thereof.

In making the comparison cell test under discharge load, one of three methods of determining whether any of the various cells of the battery are below acceptable condition may be followed. In the first method, the probe is placed across one cell of the battery and the rheostat adjusted to give a zero reading on the meter. The probe is then placed successively across each of the other cells of the battery and the indications of the meter with respect to zero obtained. If any of the readings obtained differ by more than a predetermined amount from zero, an indication is obtained that at least one cell of the battery is bad.

The second method is first to connect the probe across each of the battery cells successively and to determine which cell gives the highest reading. Then the rheostat is adjusted to yield zero indication on the test meter when the probe is across the cell giving the highest reading, and the readings taken with the probe connected across the other cells. If any of the cells yields a reading different from zero on the test meter, then the extent of difference thereof is an indication of the quality of the cell.

The third method is to place the probe across any one of the cells, adjust the rheostat to yield zero reading on the test meter, and to note the readings of the meter for connection of the probe across each of the other cells. If the readings thereby obtained do not differentiate by at least a predetermined extent from zero, the battery is good. However, if any of the readings is in the doubtful zone of meter results, the probe is placed across the cell yielding that result and the rheostat adjusted to yield zero indication. The probe is then placed across each of the other cells and the readings noted. If these readings differ by more than a predetermined extent from zero, the battery is probably bad.

It will be obvious from the above that the apparatus described could readily be adapted for an open-circuit cell voltage comparison test. That is, one of the three methods of cell voltage comparison described above could be performed with the discharge resistances disconnected from the battery, with slight modification of the apparatus. However, it has been found that a cell voltage comparison test with the battery under discharge load is more satisfactory. Consequently, the apparatus described herein was designed only for the latter type of comparison test.

A third type of test that may be performed with the apparatus described herein is of the voltage regulator of the car. For such a test to be successful, the battery must be substantially fully charged. The charger is disconnected from the battery, with switch 10 on open contact 11. The engine is started and permitted to run at a fast idle, in such fashion that the charging current, as read on the car ammeter, is of low value, but is positive. The test meter probe is then connected across a cell of the battery, with switch 55 in its lower position. The reading obtained on the meter face associated with coil 53 will then indicate the condition of the voltage regulator.

The apparatus described above provides a complete battery charging and testing device which is operable both for 12 volt and 6 volt batteries. The apparatus also provides for an open circuit or a discharge cell voltage comparison test of the battery, and various types of discharge cell voltage comparison tests may be made. A test of the voltage regulator may also be performed. This single apparatus is extremely convenient and relatively simple to use, as well as being fairly inexpensive to produce.

It will be apparent that many minor changes could be made in the apparatus described above without departure from the scope of the present invention. Accordingly, the scope of the invention is not confined to the specific embodiment described, but rather is limited only by the appended claims.

We claim:

1. A battery testing apparatus including a discharge resistance, a switch, means for connecting the series combination of said resistance and said switch across a battery, a test meter circuit including a meter coil, a variable resistance and probe means connected to the meter coil for connecting the coil across a cell of the battery, and means connected in said meter circuit operable to close said switch to connect said discharge resistance across the battery, said last-named means including a second switch operable in one position to connect the variable resistance in series between the test coil and said probe means and operable in another position to connect said coil directly to the probe means to the exclusion of the variable resistance, said last-named means operating to close said first-mentioned switch in said one position of said second switch and operating to open said first-mentioned switch in said other position of said second switch, whereby an open circuit voltage test of the battery, or a discharge cell comparison test, alternatively, may be made.

2. Apparatus as defined in claim 1 in which said means connected in said meter circuit further includes a relay connected between said probe means and said second switch in such manner that the relay is connected across the probe means when the second switch is in said one position and is disconnected from the probe means when the second switch is in said other position, and said relay controls said first-mentioned switch.

3. A combination battery charger and tester adaptable to batteries of different voltage outputs comprising a source of charging current including means for supplying current selectively at one of a plurality of output voltages and means connected to the source for selecting the output voltage supplied, a charging circuit for connecting said source to a battery, means for discharging the battery changeable to accommodate batteries of different voltage outputs, and means for connecting said discharging means to said charging circuit, said means connected to the source being also connected to the discharging means to change it to correspondence with the output voltage supplied by said source.

4. Apparatus as defined in claim 3 in which said discharging means is a resistance changed in value by said means connected to the source in correspondence with the output voltage of the source and the discharge current appropriate to be drawn from the battery to be tested under discharge.

5. Apparatus as defined in claim 3 including a test meter circuit comprising a meter coil, probe means for connection across a cell of the battery and connected to the meter coil, and means in said test meter circuit selectively operable to connect said discharging means to and disconnect said discharging means from said connecting means.

6. A combination battery charger and discharge tester adaptable to batteries of different voltage outputs, comprising a source of charging current connectable to supply one voltage output and a second higher voltage output, a charging circuit for connecting said source to a battery, a switch for connecting said source with a voltage output of said one voltage to said charging circuit in one position and for connecting said source with a voltage output of said second voltage to said charging circuit in another position, and a pair of discharge resistors, said switch being connected to said resistors and said charging circuit to connect one only of the resistors in the charging circuit when said one voltage is supplied by said source and to connect the series combination of said pair of resistors in the charging circuit when said second voltage is supplied by said source.

7. Apparatus as defined in claim 6 including a test meter circuit including probe means connectable across a cell of the battery, a meter coil connected to said probe means, and means connected in said test meter circuit operable to connect said resistors to the charging circuit.

8. Apparatus as defined in claim 7 in which said last-mentioned means comprises a relay, said test meter circuit further includes a variable resistance connected in series with the meter coil, and a switch operable in one position to connect said meter coil alone across said probe means and operable in another position to connect the series combination of said variable resistance and said meter coil across said probe means and simultaneously operable to connect said relay across said probe means.

9. A testing circuit for batteries including probe means for connection to a battery, a meter coil, a variable resistance, and switch means operable in one condition to connect the series combination of the meter coil and the resistance across the probe means and operable in another condition to connect the meter coil alone across the probe means, whereby either a cell voltage measurement or a cell voltage comparison test of the battery may be carried out.

10. A testing circuit as defined in claim 9 including a discharge resistance, and means including second switch means for connecting said resistance across the battery, whereby a test of the battery while under load may be carried out.

11. A testing circuit as defined in claim 10 in which said means including second switch means further includes means connected in the testing circuit to said first-mentioned switch means for controlling said second switch means, said means connected in the testing circuit being operable in said one condition of said first-mentioned switch means to operate said second switch means to connect the discharge resistance across the battery and being inoperative in said other position of said first-mentioned switch means.

References Cited in the file of this patent

UNITED STATES PATENTS

| | | |
|---|---|---|
| 1,922,792 | Cain | Aug. 15, 1933 |
| 2,225,231 | Pugh | Dec. 17, 1940 |
| 2,347,452 | Amsden | Apr. 25, 1944 |
| 2,431,992 | Dalzell | Dec. 2, 1947 |
| 2,675,522 | Godshalk | Apr. 13, 1954 |
| 2,689,939 | Godshalk | Sept. 21, 1954 |